(12) United States Patent
Güntherberg et al.

(10) Patent No.: US 6,498,232 B1
(45) Date of Patent: Dec. 24, 2002

(54) METHOD FOR COAGULATING PLASTICS DISPERSIONS USING A DEVICE WITH SHEARING ELEMENTS

(75) Inventors: Norbert Güntherberg, Speyer (DE); Jürgen Hofmann, Ludwigshafen (DE); Alexander Ludwig, Heidelberg (DE); Hartmut Heinen, Köln (DE); Gerd Ehrmann, Deidesheim (DE); Peter Barghoorn, Kallstadt (DE); Andreas Kleinke, Heidelberg (DE); Sven Grabowski, Ludwigshafen (DE); Rainer Nachtrab, Ludwigshafen (DE); Bernhard Czauderna, Hirschberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/857,050

(22) PCT Filed: Nov. 30, 1999

(86) PCT No.: PCT/EP99/09304

§ 371 (c)(1), (2), (4) Date: May 31, 2001

(87) PCT Pub. No.: WO00/32376

PCT Pub. Date: Jun. 8, 2000

(30) Foreign Application Priority Data

Dec. 1, 1998 (DE) .......................................... 198 55 459

(51) Int. Cl.$^7$ ................................................. C08F 6/00
(52) U.S. Cl. ...................................................... 528/502
(58) Field of Search .......................................... 528/502

(56) References Cited

U.S. PATENT DOCUMENTS

| 3,821,348 A | | 6/1974 | Planz .......................... 264/182 |
| 4,148,991 A | * | 4/1979 | Skidmore .................... 528/502 |
| 4,299,952 A | * | 11/1981 | Pingel et al. |
| 4,831,116 A | * | 5/1989 | Henton |

FOREIGN PATENT DOCUMENTS

| DE | 29 17 321 | 11/1980 |
| DE | 31 49 357 | 6/1983 |
| DE | 31 49 358 | 6/1983 |
| DE | 34 14 118 | 10/1985 |
| DE | 196 54169 | 6/1998 |
| EP | 99 532 | 2/1984 |

* cited by examiner

Primary Examiner—Terressa M. Boykin
(74) Attorney, Agent, or Firm—Keil & Weinkauf (57) ABSTRACT

Shear forces are used for essentially salt-free coagulation of plastics dispersions or rubber dispersions. For this, method of use is made of an apparatus with at least one shearing module which has a stator and a rotor arranged within the stator, where the surfaces facing toward one another in the stator and in the rotor are in each case smooth, or at least the rotor exhibits a structure formed on its surface and facing from this in the direction of the stator, and between the stator and the rotor there is a gap of predetermined gap width. The process is carried out by passing the dispersion to be coagulated through the gap between stator and rotor and precipitating the dispersion by rotation of the rotor with predetermined shear rate and shear deformation.

15 Claims, 5 Drawing Sheets

METHOD FOR COAGULATING PLASTICS DISPERSIONS USING A DEVICE WITH SHEARING ELEMENTS

The invention relates to the use of an apparatus with at least one shearing module for essentially salt-free coagulation of plastics dispersions, and also to the process carried out with this apparatus.

Many polymers are prepared by homo- or copolymerization of suitable monomers in a liquid medium, e.g. by emulsion, miniemulsion or microsuspension polymerization. Here, the polymer precipitates in the form of a usually aqueous dispersion of solid, from which the polymer has to be separated out, unless the dispersion is to be used as such.

The polymers are usually separated out from the dispersion by coagulation. There is a wide variety of different known methods for this. For example, dispersions can be coagulated by adding strong electrolytes. This is mostly done using salts which contain polyvalent cations, such as $Ca^{2+}$, $Mg^{2+}$ or $Al^{3+}$. A disadvantage of this method is that relatively large amounts of precipitating agents remain in the product and impair important product properties. Downstream washing of the precipitated polymer with large amounts of water is therefore necessary, and this causes problems in terms of costs and the environment. Another disadvantage of precipitation with electrolytes is that the precipitated product is frequently produced as a clump which comprises unprecipitated material or excess precipitating agent, or as very finely divided material difficult to separate out by sedimentation or filtration.

It has also become known that polymer dispersions can be coagulated by subjecting them to high shear forces. Here, the respective polymer dispersion is subjected to high shear forces until the polymer particles agglomerate. If the solids content of the polymer is above 20%, the polymer coagulated in this way can become pasty to crumbly.

DE-A-196 54 169 discloses a process for coagulating graft-rubber dispersions, where coagulation is brought about using shear-precipitation in a stator-rotor arrangement. Both the stator and the rotor, which rotates within the stator, have slots through which the dispersion is passed radially from the inside to the outside as a result of the rotation of the rotor. The shear to which the dispersion is subjected here is strong enough for it to coagulate.

DE-A-29 17 321 discloses a process for separating out, from an aqueous emulsion, polymers which have a softening range above 100° C., where the aqueous emulsion is coagulated in an extruder by shearing and/or heating to temperatures above the softening range of the polymer, and the coagulated material is then melted and discharged hot from the extruder, under pressure. The water is then separated out in a subsequent step. The process is very energy-intensive and requires a counter-rotating non-intermeshing twin-screw extruder for the precipitation. In addition, ammonium acetate is used as auxiliary to accelerate the coagulation, and this is undesirable for environmental reasons.

U.S. Pat. No. 3,821,348 describes a process in which acrylonitrile-copolymer dispersions or acrylonitrile-graft-polymer dispersions with a high acrylonitrile content and a very low content of elastomeric butadiene-acrylonitrile rubber are coagulated to give a paste, using a Waring mixer as the shearing apparatus, and then extruded through a fine die to give thin lengths and passed into hot water. The product is then washed, dried and finally shaped into lengths in a compression molder at 150° C.

It is an object of the present invention, in the light of this prior art, to provide an apparatus and a process for coagulating plastics dispersions or rubber dispersions, with which cost-effective coagulation of dispersions of this type becomes possible without adding chemical coagulants.

We have found that this object is achieved by using an apparatus with at least one shearing module which has a stator and a rotor arranged within the stator, where the surfaces facing toward one another in the stator and in the rotor are in each case smooth, or at least the rotor exhibits a structure formed on its surface and facing from this in the direction of the stator, and between the stator and the rotor there is a gap of predetermined gap width.

For the purposes of the present invention, "gap" is a very general and inclusive term for any desired space between rotor and stator. The predetermined gap width may therefore also include the flight depth, defined as (outer diameter of a screw minus the diameter of the screw root)/2.

This apparatus has proven very reliable in the essentially salt-free coagulation of plastics dispersions or rubber dispersions. It is fundamentally very simple in construction, and no susceptibility to clogging has been found. If desired, additional conveying modules may be used to convey the dispersion to be coagulated to the apparatus and away from the apparatus after coagulation has taken place. However, the apparatus may also be freely operated without conveying modules of this type. In particular, there is no requirement to use, for example, pressure vessels or pumps to ensure the presence of a certain pressure in advance in order to supply the apparatus with the dispersion to be coagulated.

For the purposes of the present invention, plastics dispersions are dispersions in which the homo- and/or copolymers have a glass transition temperature above 0° C., whereas the glass transition temperatures for rubber dispersions are below 0° C.

The predetermined gap width may be constant, but may also in each case vary within each of the one or more shearing modules. The diameter of the rotor here may decrease or increase in the direction of conveying. This decrease or increase in the diameter in the direction of conveying may occur more than once.

It has proven advantageous for the diameter of the rotor to diminish in the direction of conveying, or for the predetermined gap width to decrease in the direction of conveying.

The rotor may have a toothed-wheel structure, the rows of teeth in which have a circular arrangement radially around the rotor. If desired, the stator may have one or more approximately complementary rows of teeth. In this arrangement the coagulation mechanism is different from that with smooth surfaces of the stator and rotor. Whereas in that case coagulation takes place as a result of exposure to a continuous shear field, the use of a stator-rotor combination whose rotor has a surface structure, or of a stator-rotor combination with complementary toothed wheel or, respectively, rows of teeth gives a constantly repeating shear stress. The dispersion experiences a reduction in pressure once one of the rotor teeth has passed by the stator, only to be subjected again to strong shear at the next tooth which follows. This arrangement gives very intensive shear action. Depending on the requirements relating to the dispersion to be coagulated, a selection may therefore advantageously be made between a smooth stator-rotor system, i.e. a stator-rotor system with a smooth surface, and one in which at least the rotor surface has a toothed-wheel structure.

The rows of teeth on the stator and on the rotor may be approximately rectangular. They may also have an approximately star-shaped arrangement on the rotor. A helical arrangement of teeth is also possible, but for this there can be no complementary shaping of the stator.

Upstream and/or downstream of the shearing module of the apparatus used according to the invention, there may be a conveying screw with one or more flights, preferably arranged on the same shaft as the shearing module. The feeding and transport of the dispersion to be coagulated in the apparatus, and also the to discharge of the coagulated dispersion, can be made to occur of their own accord if a conveying screw is used.

The gap width may vary within a relatively wide range, depending on the dispersion to be coagulated and the product quality desired. Gap widths of from about 0.05 to 20 mm give good results, and even if the gap width is in the lower region no susceptibility to clogging of the apparatus is found. Typical gap widths which may be mentioned for a stator-rotor arrangement with a structured surface are from 0.05 to 20 mm, while for a stator-rotor combination with a smooth surface they are within the range from about 0.3 to 10 mm.

In a preferred use, the shearing module is a screw module, the screw of which forms the rotor. Particular preference is given here to a screw in which the diameter of the screw root increase in the direction of conveying. This of necessity results in a decrease in the predetermined gap width, i.e. in the flight depth in this case, where the rotor is a screw. Such a screw module is named a screw having an increasing root.

The shearing module in the form of a screw module simplifies the construction of the apparatus used according to the invention, since the screw can serve simultaneously as conveying screw and as shearing module. It has been found that this arrangement can also considerably reduce the drive power used to transport the plastics dispersion or rubber dispersion to be coagulated, where appropriate in the partially coagulated state, through the shearing apparatus.

The invention also provides a process for essentially salt-free coagulation of plastics dispersions or rubber dispersions using the apparatus described in greater detail above. In this process, the dispersion is passed through the gap between stator and rotor and is precipitated and subjected to a predetermined shear rate and shear deformation by rotation of the rotor.

This type of shear precipitation can be carried out without the addition of strong electrolytes, as coagulants, to be dispensed with. The process can also be carried out continuously.

If the shearing gap is smooth, the decisive parameters for the quality of the precipitation are the shear rate and, respectively, the shear deformation.

In a preferred embodiment, the shear rate is from about 100 to 100,000 $s^{-1}$ and the shear deformation is from about 1 to 100,000.

The rotor may rotate at a rotation rate of from about 50 to 10,000 rpm, preferably from about 200 to 8000 rpm. For a stator-rotor combination whose surface has a toothed-wheel structure, rotation rates of up to 8000 rpm have also proven successful.

The novel process may be used, for example, for coagulating plastics dispersions and preferably rubber dispersions, composed, for example, of:

from 60 to 100 parts by weight, based on the total weight of the finished dispersion, of at least one monomer (main monomer) capable of being incorporated by polymerization, from 0 to 35 parts by weight, preferably from 0 to 20 parts by weight, of at least one functional monomer (comonomer), and from 0 to 5 parts by weight, preferably from 0 to 3 parts by weight, of an α,β-unsaturated mono- or dicarboxylic acid.

The main monomer has preferably been selected from the group consisting of:

esters preferably made from α,β-monoethylenically unsaturated mono- or dicarboxylic acids having from 3 to 6 carbon atoms, for example acrylic acid, methacrylic acid, maleic acid, fumaric acid or itaconic acid, and from in general $C_1$–$C_{12}$ alkanols, preferably $C_1$–$C_8$ alkanols and in particular $C_1$–$C_4$ alkanols.

Particular esters of this type are methyl, ethyl, n-butyl, isobutyl, tert-butyl and 2-ethylhexyl acrylates and the corresponding methacrylates;

vinylaromatic compounds, such as styrene, α-methylstyrene, α-chloro-styrene and vinyltoluenes;

vinyl esters of $C_1$–$C_{18}$ mono- or dicarboxylic acids, for example vinyl acetate, vinyl propionate, vinyl n-butyrate, vinyl laurate and vinyl stearate;

butadiene.

Particularly preferred main monomers are methyl methacrylate, methyl acrylate, n-butyl methacrylate, tert-butyl methacrylate, ethyl acrylate, n-butyl acrylate, 2-ethylhexyl acrylate, styrene and vinyl acetate.

Particularly suitable monomers are:

linear 1-olefins, branched-chain 1-olefins and cyclic olefins, e.g. ethene, propene, butene, isobutene, pentene, cyclopentene, hexene, cyclohexene, octene, 2,4,4-trimethyl-1-pentene, if desired mixed with 2,4,4-trimethyl-2-pentene, $C_8$–$C_{10}$ olefins, 1-dodecene, $C_{12}$–$C_{14}$ olefins, octadecene, 1-eicosene ($C_{20}$), $C_{20}$–$C_{24}$ olefins; oligoolefins prepared with metallocene catalysis and having a terminal double bond, e.g. oligopropene, oligohexene and oligooctadecene; polyolefins prepared by cationic polymerization with a high proportion of a-olefin, for example polyisobutene. However, it is preferable for no ethene and no linear 1-olefin to be incorporated into the polymer.

Acrylonitrile, methacrylonitrile

Vinyl and allyl alkyl ethers having from 1 to 40 carbon atoms in the alkyl radical, where the alkyl radical may also have other substituents, such as hydroxyl, amino or dialkylamino, or they may have one or more alkoxylate groups, for example methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butyl-amino)ethyl vinyl ether, methyldiglycol vinyl ether, and also the corresponding allyl ethers, and mixtures of these.

Acrylamides and alkyl-substituted acrylamides, e.g. acrylamide, methyl-acrylamide, N-tert-butylacrylamide, N-methyl(meth)acrylamide.

Sulfo-containing monomers, e.g. allylsulfonic acid, methallylsulfonic acid, styrenesulfonate, vinylsulfonic acid, allyloxybenzenesulfonic acid, 2-acryl-amido-2-methylpropanesulfonic acid, and the appropriate alkali metal salts or ammonium salts of these, and mixtures of these, and also sulfopropyl acrylate, sulfopropyl methacrylate.

$C_1$–$C_4$-Hydroxyalkyl esters of $C_3$–$C_6$ mono- or dicarboxylic acids (see above), in particular of acrylic acid, methacrylic acid or maleic acid, or derivatives of these alkoxylated with from 2 to 50 mol of ethylene oxide, propylene oxide, butylene oxide, or mixtures of these, or esters, with the acids mentioned, of $C_1$–$C_{18}$ alcohols alkoxylated with from 2 to 50 mol of ethylene oxide, propylene oxide, butylene oxide or mixtures of these, for example hydroxyethyl (meth)acrylate, hydroxypropyl (meth)acrylate, 1,4-butanediol monoacrylate, ethyldiglycol acrylate, methylpolyglycol acrylate (11 EO), (meth)acrylates of $C_{13}/C_{15}$ oxoalcohols reacted with 3, 5, 7, 10 or 30 mol of ethylene oxide, or mixtures of these.

Vinylphosphonic acid, dimethyl vinylphosphonate and other phosphorus-containing monomers.

Alkylaminoalkyl (meth)acrylates, alkylaminoalkyl(meth) acrylamides or quaternization products of these, for example 2-(N,N-dimethylamino)ethyl (meth)acrylate, 3-(N,N-dimethylamino)propyl (meth)acrylate, 2-(N,N, N-trimethylammonium)ethyl (meth)acrylate chloride, 2-dimethyl-aminoethyl(meth)acrylamide, 3-dimethylaminopropyl(meth)acrylamide, 3-trimethylammoniumpropyl(meth)acrylamide chloride.

Allyl esters of $C_1$–$C_{30}$ monocarboxylic acids.

N-Vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, 4-vinylpyridine.

Diallyldimethylammonium chloride, vinylidene chloride, vinyl chloride, acrolein, methacrolein.

Monomers containing 1,3-diketo groups, for example acetoacetoxyethyl (meth)acrylate and diacetoneacrylamide, monomers containing urea groups, for example ureidoethyl (meth)acrylate, acrylamidoglycolic acid, methyl methacrylamidoglycolate.

Monomers containing silyl groups, for example trimethoxysilylpropyl methacrylate.

Monomers containing glycidyl groups, for example glycidyl methacrylate.

Dispersions suitable for the novel coagulation process, besides normal emulsions, are in particular graft-rubber dispersions which have been prepared in aqueous emulsion at least in the final stage of the graft polymerization, by grafting of the elastomers with the monomers for the graft shell.

For the purposes of the present invention, graft rubbers are in particular those graft polymers in which monomers forming hard thermoplastics, for example in particular styrene, acrylonitrile and/or methyl methacrylate, are grafted as a graft shell onto particle cores made from soft rubber. This is done by polymerizing or copolymerizing the monomers for the graft shell in the presence of the rubber particles. Suitable soft rubbers are elastomeric polymers and/or copolymers with glass transition temperatures below –10° C., preferably below –30° C. Particularly suitable polymers are elastomeric 1,3-diene homo- and copolymers, such as homo- and copolymers of butadiene, isoprene or chloroprene, preferably butadiene rubber, and also elastomeric acrylate homo- and/or copolymers with the low glass transition temperatures mentioned. Preferred polymers for the graft rubbers coagulated according to the invention are elastomeric acrylate polymers and 1,3-diene homo- and copolymers, for example homo- and copolymers of $C_4$–$C_8$-alkyl acrylates, in particular of n-butyl acrylate and/or 2-ethylhexyl acrylate. Examples of preferred comonomers for the alkyl acrylates are crosslinking monomers having at least two nonconjugated C=C double bonds, for example diallyl maleate, diallyl phthalate, diacrylates and dimethacrylates of diols, such as 1,4-butanediol or 1,6-hexanediol, etc., and also allyl methacrylate and dihydrodicyclopentadienyl acrylate, used in particular in amounts of from 0.5 to 10% by weight of the total amount of monomers in the elastomer preparation, and also polar monomers, such as acrylic acid, methacrylic acid, maleic anhydride, acrylamide, methacrylamide, N-methylolacrylamide and -methacrylamide, and alkyl ethers of these. The proportion of the elastomers in the graft rubber is generally from 30 to 85% by weight. The novel process may be used without difficulty to coagulate graft rubbers whose elastomer proportion is more than 30% by weight, based on the total solids content.

Suitable monomers for polymerizing-on the graft shell are in particular monomers and mixtures of these which form hard polymers or copolymers with glass transition temperatures above +50° C. The type of monomer(s) depends here to a large extent on the type of the thermoplastics which form the polymer matrix after blending with the graft rubber and with which the graft shell should have some degree of compatibility or affinity, in order to achieve a fine two-phase distribution of the graft rubbers in the matrix. Particularly suitable and usual monomers are those having from 8 to 12 carbon atoms, for example, styrene, α-methylstyrene, and also styrenes and a-methylstyrenes which have one or more alkyl substituents, in particular methyl substituents, on the benzene ring. They may be the sole monomers for preparing the graft shell, or be used in a mixture with other monomers, such as methyl methacrylate, methacrylonitrile or preferably acrylonitrile, in which case the proportion of methacrylonitrile monomer units and/or acrylonitrile monomer units in the graft shell is from 0 to 45% by weight, preferably from 10 to 40% by weight, of the graft shell. Preference is given to mixtures of styrene with from 10 to 40% by weight of acrylonitrile, based on the total amount of monomers. Other preferred monomers which may be mentioned for preparing the graft shell are methacrylates and acrylates, preferably methyl methacrylate, which may also be used as sole monomer or as the quantitatively predominant monomer for preparing the graft shell. Other suitable comonomers for preparing the graft shell are maleic anhydride, maleimide, N-phenylmaleimide, acrylic acid and methacrylic acid.

Examples of the preparation of dispersions of this type suitable for the application of shear precipitation are described, for example, in DE-C-2 60 135, DE-A-3 22 75 55, DE-A-3 14 93 57, DE-A-3 14 93 58 and DE-A-3 41 41 18, which are expressly incorporated herein by way of reference. However, these are in the nature of examples. The application of the shear precipitation according to the invention is not restricted to the examples of dispersions mentioned here.

More detailed descriptions will now be given of the novel apparatus, using embodiments shown in the drawing, and of the novel process, using experimental examples.

FIG. 2 a–f shows various forms of the rotor showing diagrammatically the transition from a smooth rotor to a rotor whose surface has a structure with rows of teeth.

Figure 1:
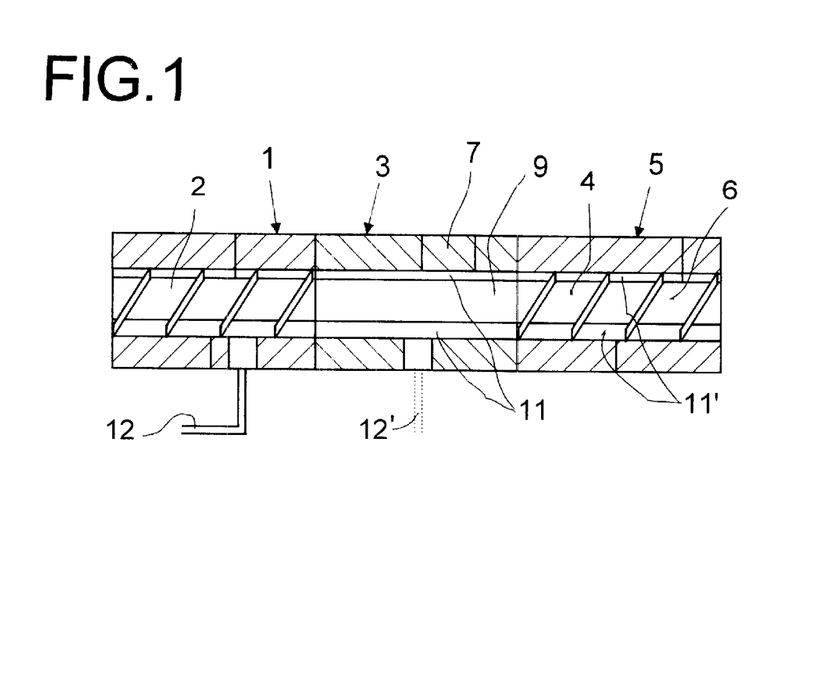
FIG. 1 shows a diagram of the novel apparatus with a shearing module.
Figure 2:
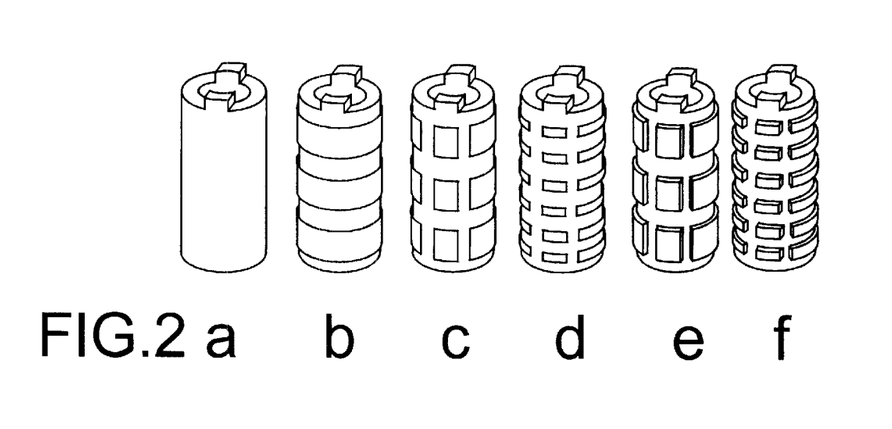

FIG. 1 is a basic construction diagram for the apparatus used according to the invention for essentially salt-free coagulation of plastics dispersions. A version of the apparatus which has a basic construction still further simplified in comparison to this is also described below with reference to FIG. 8 from Example 20.

The apparatus of FIG. 1 is composed of a feed zone, indicated overall by 1, intended for the dispersion to be coagulated and having a conveying module which is a screw module 2, of the actual shearing zone with the shearing module indicated overall by 3, and of a metering zone, indicated overall by 5 and likewise having a screw module 6. Each of the feed zone 1 and metering zone 5 is optional and may also therefore be absent. The shearing module 3 has a fixed cylindrical stator 7 and a rotor 9 which is also cylindrical and rotates within the stator 7. In the diagram of FIG. 1 both the stator 7 and the rotor 9 have a smooth surface. Between the stator 7 and the rotor 9 there is a gap 11 which has a defined and predetermined gap width.

The dispersion to be coagulated is fed radially into the novel apparatus, either via the feed line 12 into the feed zone 1 and from there axially into the shearing module 3 or directly via the feed line 12' (shown here with a broken line) into the gap 11.

If there is a feed zone 1, in the area of which the dispersion is to be introduced, the latter is then preferably conveyed axially by way of at least one screw module 2 through the gap 11 formed between the stator 7 and the rotor 9. If there is a metering zone 5, downstream conveying also preferably takes place by way of at least one screw module 6.

If the dispersion is added via line 12' directly into the gap 11 it is conveyed by means of an external conveying system, the detail of which is not shown in FIG. 1, or with the aid of static pressure.

If desired, there may be points for measuring pressure and/or temperature in the feed zone 1, in the shearing zone formed by the shearing module 3 and/or in the metering zone 5.

Within the shearing module 3, the rotor 9 has been mounted on a rotatably mounted shaft not shown in further detail in FIG. 1. The rotation of the rotor 9 subjects the dispersion to shear forces sufficiently high to bring about their coagulation. In the apparatus of FIG. 1 the gap width is constant. It may, however, also vary within the shearing module 3, and this is brought about by one or more reductions or increases in the diameter of the rotor 9 in the direction of conveying.

Each of FIGS. 2a to 2f show a rotor 9 with a surface structure varying from a smooth surface (FIG. 2a) to a surface structure with rows of teeth of varying height (FIG. 2c–2f). Here, the surface structure on the rotor 9 is radial rows 13 of teeth in a star-shaped arrangement around the axis 15 of rotation of the apparatus shown in FIG. 3. The stator 7 belonging to each of the rotors 9 in FIGS. 2c to 2f likewise has the form of a toothed wheel and is composed of rows 13 of teeth which have a circular arrangement radially around the rotor shaft (not shown) giving an embodiment of the stator 7 which is complementary to the rotor 9.

Figure 3:
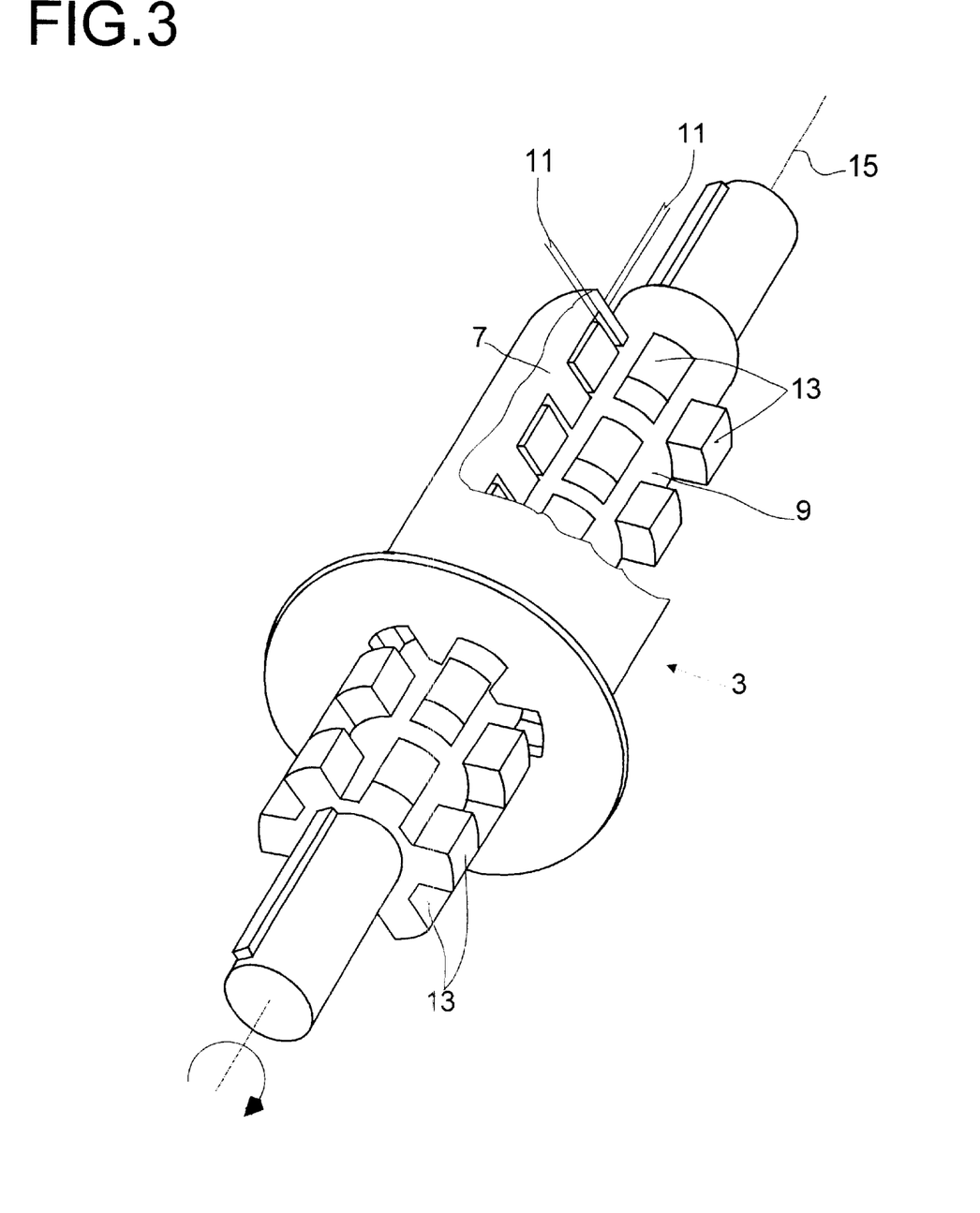
FIG. 3 shows a diagram, partly sectioned, of a shearing module with a rotor-stator combination whose surface has a structure with rows of teeth.

This is shown diagrammatically in FIG. 3, where the rotor 9 and the stator 7 in each case have a surface structure in the form of rows 13 of teeth.

Figure 4:
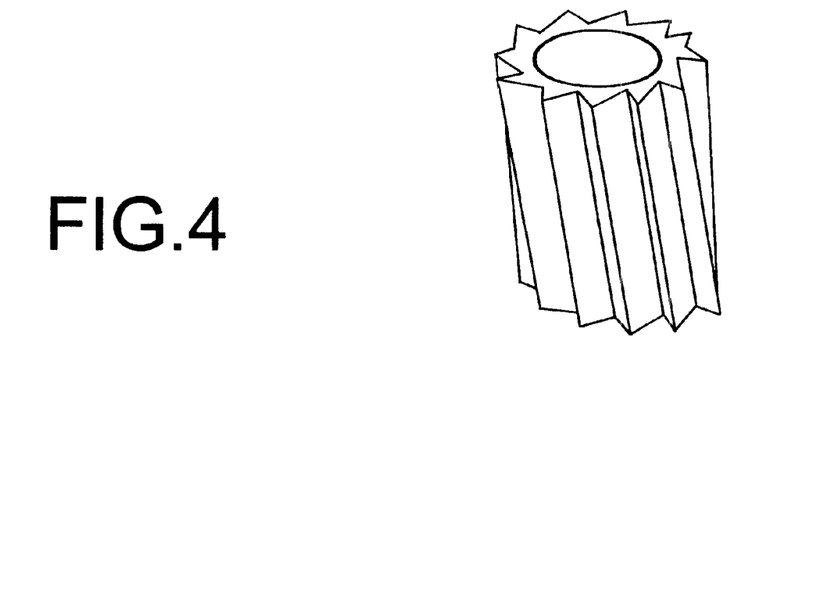
FIG. 4 is a diagram of a rotor with a helical arrangement of teeth.

FIG. 4 shows another embodiment of a surface structure for the rotor 9 in the form of a helical arrangement of teeth. Here, however, the stator 7 always has a smooth surface. As well as the surface structures described here and shown in the attached FIGS. 2 and 4 for the rotor 9 and, where appropriate, for the stator 7, there are many other possible embodiments. For example, the surface of the rotor 9 may be essentially smooth but have a structure in the form of studs, or else the rows of teeth shown in FIG. 2 may have a diagonal arrangement. The individual teeth may also have a diagonal shape and are then, for example, diamond-shaped instead of rectangular. In each case, the stator 7 belonging to the arrangement complements the rotor or is smooth. The surface structures described here are merely examples.

The following examples were carried out using apparatus complying with this general description. In the following, therefore, details are given only of modifications to the construction of the apparatus and, where appropriate, of embodiments of the stator-rotor combination 7, 9.

EXAMPLES 1 TO 4

Preparation of a Graft Rubber a) Preparation of the Base from Polybutadiene

Butadiene was polymerized in aqueous emulsion, as specified in lines 5 to 34 of page 15 of DE-A-31 49 046, which is expressly incorporated herein by way of reference. The resultant polybutadiene latex had a solids content of about 40% by weight and an average particle size $d_{50}$ of about 80 nm.

b) Agglomeration of the Polybutadiene Base and Grafting with Styrene-acrylonitrile.

50 kg of the polybutadiene latex prepared under a) were the initial charge in a reactor provided with a stirrer and with a point for measuring temperature. After heating to about 75° C., 1 kg of an agglomeration latex made from about 96% by weight of ethyl acrylate and about 4% by weight of methacrylamide (with a solids content of about 10% by weight) was added. This gave a partially agglomerated polybutadiene latex with a bimodal particle size distribution and an average particle size $d_{50}$ of 220 nm.

0.2 kg of potassium stearate and 0.025 g of potassium persulfate were added at about 75° C. to the latex agglomerated in this way. After adding 1.47 kg of styrene and 0.63 kg of acrylonitrile, the mixture was polymerized for about 15 minutes and then a mixture of 7.35 kg of styrene and 3.15 kg of acrylonitrile was added within a period of 3 further hours. 0.025 kg of potassium persulfate was then added and stirring was continued at about 75° C. for a further 1.5 hours.

c) Coagulation of the Dispersion Prepared as in a) and b)

Figure 5:
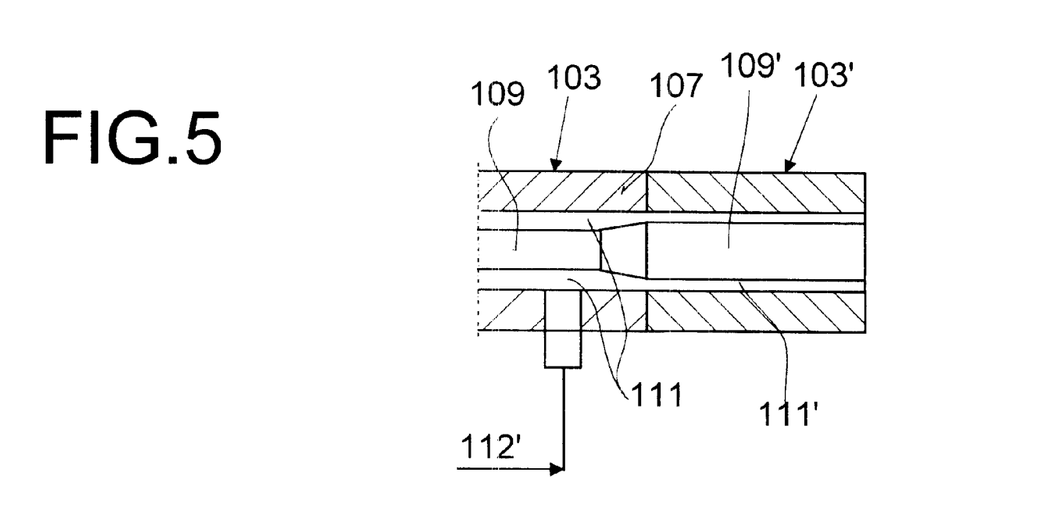
FIG. 5 is a diagram of the novel apparatus in a version used for Examples 1 to 4.

The dispersion prepared under a) and b) was coagulated by the novel process. The apparatus used for this is shown in FIG. 5. The figures used to indicate features of the apparatus in FIG. 5 which are comparable with those in FIG. 1 are higher by 100 than those in FIG. 1.

The apparatus used has no feed zone 1, and the dispersion to be coagulated was therefore added directly and radially into the gap 111 by way of feed line 112', using a static pressure level prevailing outside the apparatus, or using a pump. As shown in FIG. 5, two shearing modules 103, 103' coupled to one another were used, and the dispersion was conveyed into the first shearing module 103, which is composed of a smooth stator 107 and of a smooth rotor 109 and brings about precoagulation of the dispersion. In this first shearing module 103 the gap width is about 4.5 mm. From there, the dispersion passes onward into the second shearing module 103', likewise composed of a smooth stator 107' and of a smooth rotor 109'. Prior to the transition from the first shearing module 103 to the second shearing module 103', i.e. in the direction of conveying, the diameter of the rotor 109 increases.

The gap width of the gap 111' in the second shearing module 103' is 0.5 or 1 mm and is another area of coagulation. Therefore, only this gap width is given in Table 1. The rotation rates for rotor 109 and 109' are given in Table 1. After passing through the second shearing module 103', the coagulated dispersion is discharged directly without use of a metering zone. The length of each shearing module 103, 103' is about 90 mm, and the diameter of the stator 107 is about 30 mm in the case of both of the shearing modules 103, 103'. The other process parameters are given in Table 1.

TABLE 1

| Experiment No. | Gap width | Rotation rate | Throughput | Remarks |
|---|---|---|---|---|
| 1 | 1 mm | 2400 rpm | 22 kg/h | coagulation |
| 2 | 0.5 mm | 2431 rpm | 11 kg/h | coagulation |
| 3 | 1 mm | 1173 rpm | 27 kg/h | coagulation |
| 4 | 1 mm | 911 rpm | 92 kg/h | no coagulation |

EXAMPLES 5 TO 9

Figure 6:
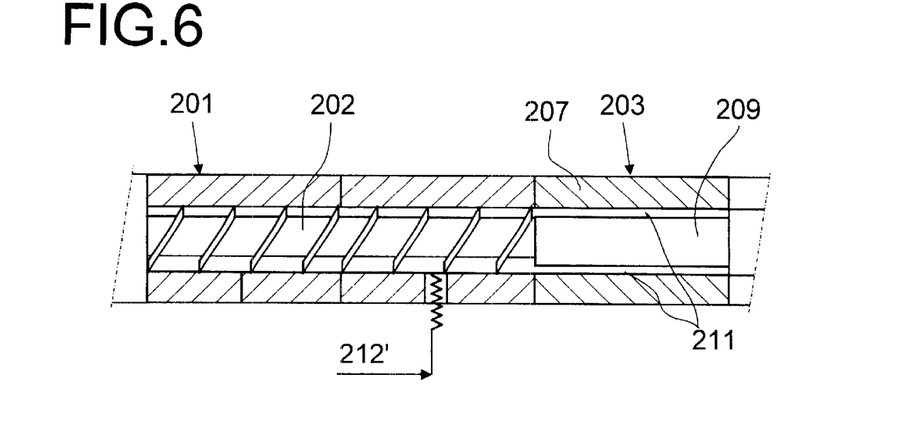
FIG. 6 is a diagram of the novel apparatus in another version used for Examples 5 to 9.

In Examples 5 to 9 described below the method for stages a) and b) of the preparation was again as described above in Examples 1 to 4, and the resultant dispersion was coagulated by the novel process. The apparatus used here is shown in FIG. 6. The figures used to indicate features which are comparable with those in FIG. 1 are higher by 200 than those in FIG. 1.

The apparatus has a feed zone 201 of length about 180 mm, and this area has a screw module 202 for conveying the dispersion to be coagulated and fed via line 212. This conveys the dispersion into the shearing module 203, composed of a smooth stator 207 and a smooth rotor 209, forming a gap 211 of gap width about 0.5 mm or 1 mm. The length of the shearing module 203 is about 90 mm and the internal diameter of the stator 207 is about 30 mm. After passing through the shearing module 203, the coagulated dispersion is discharged directly, without using a metering zone. Table 2 gives the results of the coagulation, stating in each case the rotation rate for the rotor 209.

TABLE 2

| Experiment No. | Gap width | Rotation rate | Throughput | Remarks |
|---|---|---|---|---|
| 5 | 1 mm | 5170 rpm | 33 kg/h | coagulation |
| 6 | 1 mm | 2430 rpm | 30 kg/h | coagulation |
| 7 | 1 mm | 3650 rpm | 43 kg/h | coagulation |
| 8 | 0.5 mm | 2428 rpm | 33 kg/h | coagulation |
| 9 | 0.5 mm | 1190 rpm | 25 kg/h | coagulation |

EXAMPLES 10 TO 13

The dispersions, which were prepared as stated in Examples 1 to 4 under a) and b) were coagulated in an apparatus corresponding to that shown diagrammatically in FIG. 1. The length of the feed zone 1 here is about 90 mm, and it has a conveying screw module 2. Attached to this is the shearing module 3, composed of the smooth stator 7 and the likewise smooth rotor 9. The gap width of the gap 11 in the shearing module 3 is 1 mm. Attached to the shearing module 3 is a metering zone 5 likewise having a conveying screw module 6. The dispersion is passed directly into the gap 11 of the shearing module 3 and coagulated by exposure to the shear forces from rotation of the rotor 9 at the rotation rates given in Table 3. The length of the shearing module 3 is about 90 mm and the internal diameter of the stator 7 is about 30 mm. The results are given in Table 3.

TABLE 3

| Experiment No. | Gap width | Rotation rate | Throughput | Remarks |
|---|---|---|---|---|
| 10 | 1 mm | 3660 rpm | 20 kg/h | coagulation |
| 11 | 1 mm | 2430 rpm | 31 kg/h | coagulation |
| 12 | 1 mm | 2420 rpm | 42 kg/h | coagulation |
| 13 | 1 mm | 3500 rpm | 79 kg/h | coagulation |

EXAMPLES 14 TO 17

Preparation and Coagulation of a Graft-rubber Dispersion with Elastomeric Polyacrylate as Graft Base.

a) 160 parts of a mixture made from 98% of butyl acrylate and 2% of dihydrodicyclopentadienyl acrylate were heated to 60° C. with stirring in 1500 parts of water, with addition of 5 parts of the sodium salt of a C12–C18 paraffinsulfonic acid, 3 parts of potassium peroxodisulfate, 3 parts of sodium hydrogencarbonate and 1.5 parts of sodium diphosphate. 15 minutes after the start of the polymerization reaction, a further 840 parts of the monomer mixture were added within a period of 3 hours. After monomer addition had ended, the emulsion was held at 60° C. for one further hour. The glass transition temperature of the resultant elastomer was −42° C.

2100 parts of the emulsion were mixed with 1150 parts of water and 2.7 parts of potassium peroxodisulfate, and heated to 65° C., with stirring. Once this temperature had been reached, 560 parts of a mixture made from 75% of styrene and 25% of acrylonitrile were metered in within a period of 3 hours. After the addition had ended, the mixture was held at about 65° C. for about 2 more hours. The glass transition temperature of a copolymer made from 75% of styrene and 25% of acrylonitrile is 111° C.

The resultant dispersion was coagulated in an apparatus as also used for Examples 5 to 7 and described there with reference to FIG. 6. The experimental results are given in Table 4 together with the respective rotation rate of the rotor 209.

TABLE 4

| Experiment No. | Gap width | Rotation rate | Throughput | Remarks |
|---|---|---|---|---|
| 14 | 0.5 mm | 1180 rpm | 21 kg/h | coagulation |
| 15 | 0.5 mm | 2420 rpm | 18 kg/h | coagulation |
| 16 | 0.5 mm | 3660 rpm | 20 kg/h | coagulation |
| 17 | 0.5 mm | 980 rpm | 110 kg/h | incomplete coagulation |

EXAMPLE 18

Preparation of another Graft-rubber Dispersion with Polybutadiene as Graft Base 60 parts of butadiene were polymerized at 65° C. to a monomer conversion of 98% in a solution of 0.6 parts of tert-dodecyl mercaptan, 0.7 parts of sodium $C_{14}$-alkylsulfonate as emulsifier, 0.2 parts of potassium peroxodisulfate and 0.2 parts of sodium bicarbonate in 80 parts of water. The polybutadiene in the resultant latex had an average particle size of 100 nm and was therefore agglomerated by adding 25 parts of a 10% strength emulsion of a copolymer made from 96% of ethyl acrylate and 4% of methacrylamide, whereupon the average particle size became 350 mm. The glass transition temperature of the polybutadiene is −85° C.

To the product were added 40 parts of water, 0.4 part of sodium C14-alkylsulfonate and 0.2 part of potassium peroxodisulfate.

40 parts of a mixture of 70% of styrene and 30% of acrylonitrile were added gradually within a period of 4 hours, and the mixture was held at 75° C., with stirring. The monomer conversion was practically quantitative. The glass transition temperature of a copolymer made from 70% of styrene and 30% of acrylonitrile is about +105° C.

Figure 7:
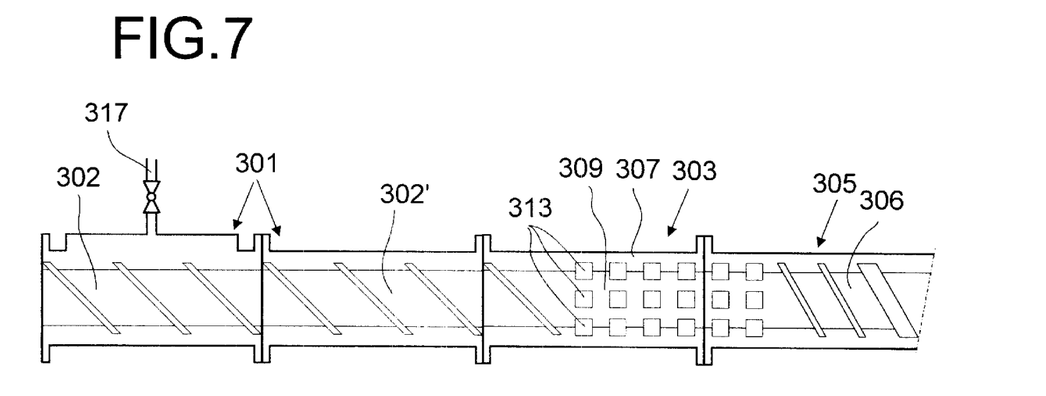
FIG. 7 is a diagram of the novel apparatus in another version used for Example 18.

The resultant dispersion was coagulated by the novel process in an apparatus shown in FIG. 7. The figures used to indicate features of the apparatus in FIG. 7 which are comparable with those in FIG. 1 are higher by 300 than those in FIG. 1.

The feed zone 310 here is composed of the single-flight conveying module 302. Attached to the feed zone 301 is the shearing module 303. This, however, is not composed of a smooth stator 307 and rotor 309 but has a stator-rotor combination 307, 309 in which the stator 307 is a toothed wheel and is composed of rows of teeth in a circular arrangement radially around the rotor shaft, no further detail of which is given. The rotor 309 is composed of radial rows 313 of teeth which are complementary to the rows of teeth on the stator 307 and have a star-shaped arrangement around the axis of rotation of the apparatus. The stator 307 and the rotor 309 here intermesh so as to form a gap 311 not expressly shown in FIG. 7, with a gap width of 0.5 mm.

Attached to the shearing module 303 there is the metering zone 305, in the form of a double-flighted conveying screw.

Here, as in the embodiments described above of the novel apparatus, there may, if desired, be feed lines 317, 317', 317" in the feed zone 301, in the shearing module 303 and/or in the metering zone 305, for solvents, such as water, and/or additives. The feed lines 317', 317" are not included in FIG. 7 for reasons of clarity.

The rotation rate of the rotor 309 was set at about 8000 rpm. With a throughput of 240 kg/h complete coagulation of the dispersion described was achieved, with problem-free running of the apparatus. After the experiment had ended, residual dispersion could no longer be detected in the product. This confirms that precipitation is complete.

EXAMPLE 19
Precipitation of a Plastics Dispersion by Shear

A dispersion made from poly(n-butyl acrylate-co-styrene) with styrene/n-butyl acrylate=50/50, solids content=39.1%, particle size $d_{50}$=182 nm, was precipitated in the apparatus described in Examples 10 to 13.

TABLE 5

| Experiment | Gap width | Rotation rate | Remarks |
| --- | --- | --- | --- |
| 18 | 1 mm | 4400 rpm | coagulation |

EXAMPLES 20 TO 24

The graft-rubber dispersions mentioned in Examples 14 to 17 with elastomeric polyacrylate as graft base were also coagulated using the modified apparatus shown diagrammatically in FIG. 8 and described below.

The details given below are therefore essentially the changes in the construction of the apparatus. The figures used to indicate features of the apparatus in FIG. 8 which are comparable with those in FIG. 1 are higher by 400 than those in FIG. 1.

Figure 8:
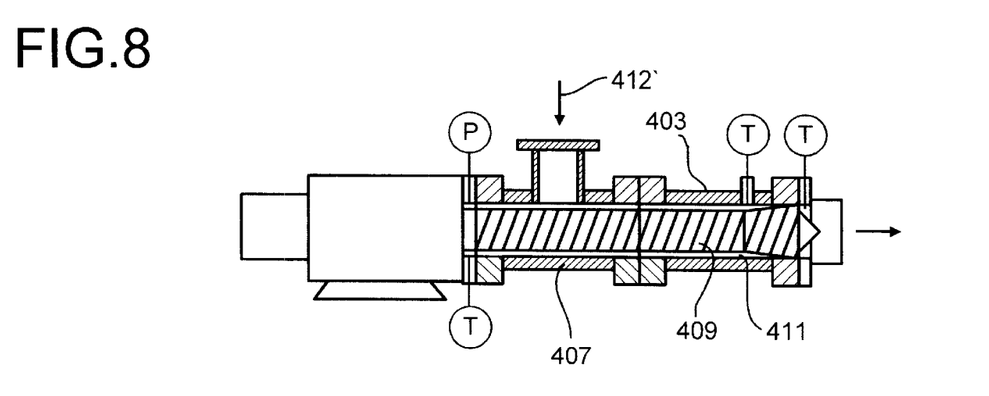
FIG. 8 is a diagram of another preferred embodiment of the apparatus used according to the invention with a screw having an increasing root as rotor.

A significant difference which should be mentioned between the embodiment of the novel apparatus as in FIG. 1 and the modification as in FIG. 8 is that the precipitation of the particular plastics dispersion or rubber dispersion and its conveying through the shearing apparatus take place together and simultaneously in a shearing module 403, composed of a fixed cylindrical stator 407 and of a rotor 409 in the form of a screw, where the diameter of the screw root increases in the direction of conveying, and is 93,5–105 mm as far as this embodiment is concerned. The diameter of the bar, or crosspiece, i.e. the unbevelled part of the screw, is 109,5 mm, and the screw has a length of 110 mm. The gap 411 formed between the stator 407 and the rotor 409, with a predetermined defined gap width, is therefore determined in this working example by the flight depth of the screw. Since the diameter of the screw root increases in the direction of conveying it follows that the predetermined gap width and, respectively, the flight depth, of such an arrangement showing a screw with an increasing root, decreases in the direction of conveying.

In this working example, the dispersion to be coagulated is passed radially by way of the feed line 412' into the shearing module 403. As previously in Working Example 1, the dispersion is added via an external conveying system, no further detail of which is given in FIG. 8, or with the aid of static pressure. If desired, there are points for measuring pressure and/or temperature in the shearing zone formed by the shearing module 403. Each of these is indicated in FIG. 8 by P for pressure-measurement point(s) and T for temperature-measurement point(s). The diameter of the shearing apparatus was 110 mm.

TABLE 6

| Experiment No. | Rotation rate | Throughput | Remarks |
| --- | --- | --- | --- |
| 20 | 1000 rpm | 600 kg/h | complete coagulation |
| 21 | 2000 rpm | 1000 kg/h | complete coagulation |
| 22 | 2700 rpm | 1100 kg/h | complete coagulation |
| 23 | 1300 rpm | 500 kg/h | complete coagulation |
| 24 | 1700 rpm | 800 kg/h | complete coagulation |

We claim:

1. An apparatus for essentially salt-free coagulation of plastics dispersions or rubber dispersions, comprising at least one shearing module (3, 103, 103', 203, 303, 403) said shearing module having a stator (7, 107, 207, 307, 407) and a rotor (9, 109, 109', 209, 309, 409) arranged within the said stator (7, 107, 207, 307, 407) where the surfaces facing toward one another in the said stator (7, 107, 207, 307, 407) and in the said rotor (9, 109, 109', 209, 309, 409) are in each case smooth, or at least the said rotor exhibits a structure formed on its surface and facing from this in the direction of the said stator (7, 107, 207, 307, 407) and between the said stator (7, 107, 207, 307, 407) and the said rotor (9, 109, 109', 209, 309, 409) there is a gap (11, 111, 111', 211, 311, 411) of predetermined width.

2. The apparatus as claimed in claim 1, wherein the diameter or the rotor (9, 109, 109', 209, 309, 409) decreases or increases in the direction of conveying.

3. The apparatus as claimed in claim 1, wherein the predetermined gap width decreases in the direction of conveying.

4. The apparatus as claimed in claim 1, wherein the rotor (9, 109, 109',209, 309) has toothed-wheel structure, the rows (13, 313) of teeth in which have a circular arrangement radially around the rotor (9, 109, 109', 209, 309).

5. The apparatus as claimed in claim 1, wherein the rotor (9, 109, 109', 209, 309) has a toothed-wheel structure, the rows (13, 313) of teeth in which have a circular arrangement radially around the rotor (9, 109, 109', 209, 309) and the teeth on the rotor (9, 109, 109', 209, 309) are approximately rectangular.

6. The apparatus as claimed in claim 1, wherein the rotor (9, 109, 109',209, 309) has a toothed-wheel structure, the rows (13, 313) of teeth in which have a circular arrangement radially around the rotor (9, 109, 109', 209, 309) and the rows (13, 313) of teeth on the rotor (9, 109, 109',209, 309) have an approximately star-shaped arrangement.

7. The apparatus as claimed in claim 1, wherein the rotor (9, 109, 109',209, 309) has a toothed-wheel structure, the rows (13, 313) of teeth in which have a circular arrangement radially around the rotor (9, 109, 109', 209, 309) and there is a helical arrangement of teeth.

8. The apparatus as claimed in claim 1, wherein upstream and/or downstream of the shearing module (3, 103, 103', 203, 303) there is a conveying screw with one or more flights.

9. The apparatus as claimed in claim 1, wherein the gap width is from 0.05 to 20 mm.

10. The apparatus as claimed in claim 1, wherein the shearing module (403) is a screw module, the screw of which forms the rotor (409).

11. A process for essentially salt-free coagulation of dispersions using the apparatus as claimed in claim 1, in which the dispersion is passed through the gap (11, 111, 111', 211, 311, 411) between stator (7, 107, 207, 307, 407) and rotor (9, 109, 109', 209, 309, 409) and is precipitated by rotation of the rotor (9, 109, 109', 209, 309, 409) with a predetermined shear rate and shear deformation.

12. The process as claimed in claim 11, wherein the shear rate is from about 100 to 100,000 $s^{-1}$ and the shear deformation is from about 1 to 100,000.

13. The process as claimed in claim 11, wherein the rotor (9, 109, 109', 209, 309, 409) rotates at a rotation rate of from about 50 to 10,000 rpm.

14. The process as claimed in claim 11, where the dispersions are polymer dispersions or graft-rubber dispersions.

15. The process as claimed in claim 13, wherein the rotor (9, 109, 109', 209, 309, 409) rotates at a rotation rate of from 200 to 8000 rpm.

* * * * *